July 14, 1925.
W. H. COTTON
BUMPER
Filed June 14, 1923
1,545,486
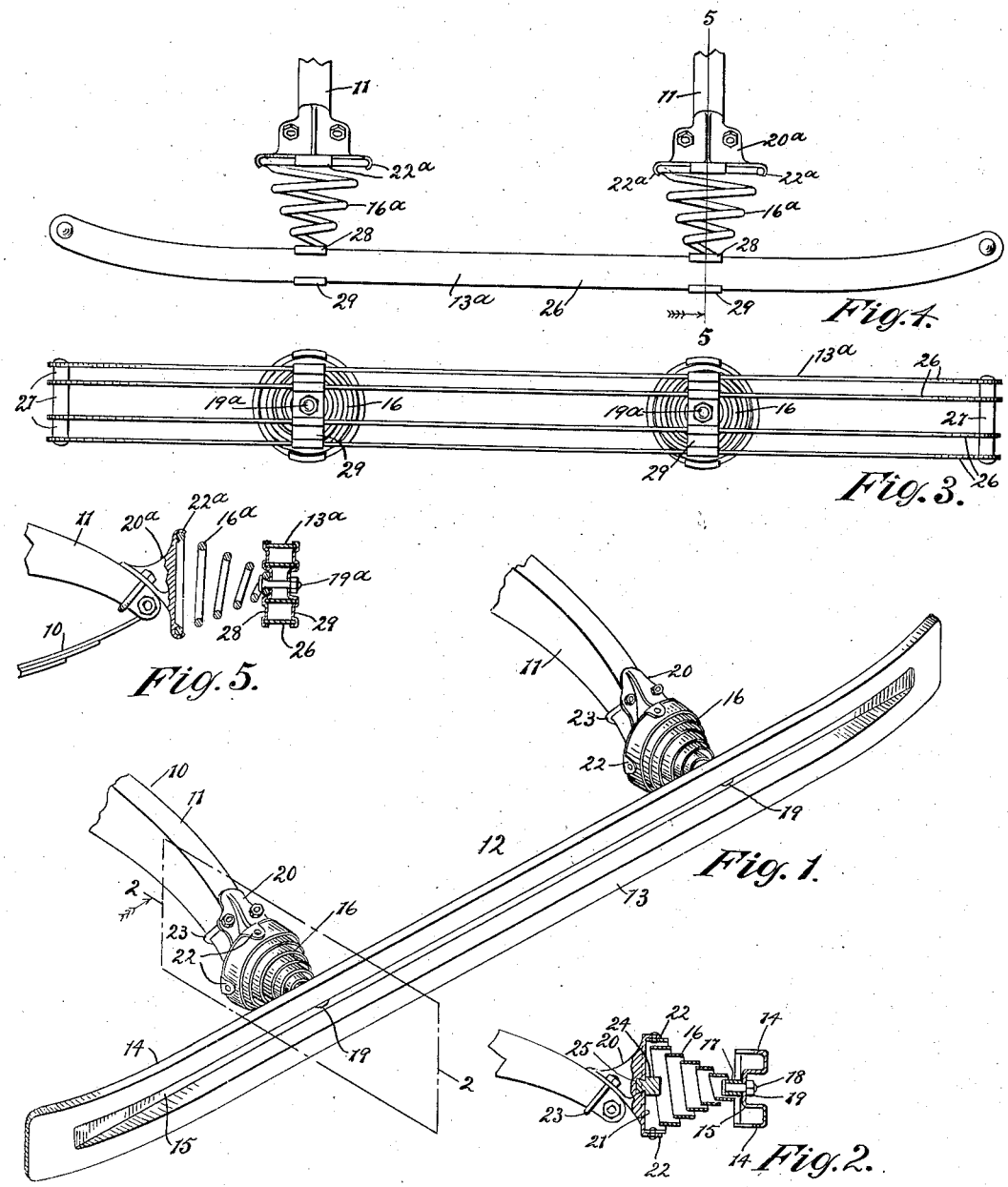

Patented July 14, 1925.

1,545,486

UNITED STATES PATENT OFFICE.

WALTER H. COTTON, OF CHICAGO, ILLINOIS.

BUMPER.

Application filed June 14, 1923. Serial No. 645,322.

*To all whom it may concern:*

Be it known that I, WALTER H. COTTON, a citizen of the United States, and resident of Chicago, county of Cook, and State of Illinois, have invented certain new and useful Improvements in Bumpers, of which the following is a specification, and which are illustrated in the accompanying drawings, forming a part thereof.

This invention relates to bumpers for motor vehicles and the like; and one of the objects of the invention is the production of a new and improved bumper mechanism that is yielding to forces or opposing bodies squarely striking the same, and that also has a limited resilience when struck obliquely.

Another object of the invention is the production of a bumper that is resilient in all directions and so constructed that it will not be elevated or depressed except to a limited extent when the same comes in contact with an opposing force or body.

Another object of the invention is the production of a bumper bar that is extremely light in construction, cheap to manufacture and one that is sufficiently strong and durable for the purpose intended.

Other and further objects and advantages of the invention will appear from the following description taken in connection with the accompanying drawings, in which—

Fig. 1 is a perspective view of a portion of a vehicle, showing the invention in position thereon;

Fig. 2 is a vertical section on line 2—2 of Fig. 1;

Fig. 3 is a front elevation of a slightly modified form of the device;

Fig. 4 is a plan view of a still further modification; and

Fig. 5 is a vertical section on line 5—5 of Fig. 4.

On the drawings the reference character 10 designates a portion of a motor vehicle, having the usual chassis frame members 11 for supporting the body of the vehicle, not shown.

Referring now to the form of the device shown in Figs. 1 and 2 the reference character 12 designates the bumper which comprises the bumper bar or impact plate 13, the resilient members for supporting the same and the attaching brackets by means of which the device is secured to the motor vehicle.

In the construction of bumper bars it is desirable that the same should be as light as possible in order not to encumber the vehicle with unnecessary weight. It is also necessary that the bar be strong and at the same time present a more or less extended surface toward the front so that as little damage as possible will result from impacts with human beings or other objects.

The bar or plate 13 is strengthened by means of a flange 14 which extends about the periphery of the same. In order to further strengthen the bar or plate 13, the central portion thereof is depressed to form a central longitudinally extending reinforcing rib 15. This rib may terminate short of the ends of the bar as shown in Fig. 1, if desired. This bar is preferably stamped to the proper form from sheet-metal, although it is understood it may be made otherwise and from other material.

Suitable means are provided for resiliently mounting the bar on the front end of the chassis frame. In order that there may be a resilient or yielding lateral movement of the bar when the same strikes an object a glancing blow, coil springs 16 are employed.

In order that the bar shall not project forwardly to an objectionable extent, and at the same time have all the movements necessary for a bumper, the springs 16 are preferably telescopic or conical which permits their complete collapse, thus affording a maximum rearward movement of the bar from its normally projected position. As shown in Figs. 1 and 2 the resilient members are volute flat metal springs with the convolutions slightly overlapping each other. A lateral movement of the bar will cause the convolutions to engage each other to thereby limit or at least materially resist any further lateral movement of said bar and thus prevent the same from extending laterally beyond the side of the vehicle to an objectionable extent. Moreover, this arrangement together with the shortness of the spring which lends to its rigidity will prevent the bar from being turned upwardly or downwardly when the same comes in contact with an object.

The front end of each spring 16 may be bent to form a circular loop 17 for the reception of a securing bolt 18 which extends forwardly through a suitable opening in the base of the depression or rib 15. Suitable fastening means as the nuts 19 secure the parts in assembled relation. It will be noted that the fastening means 19 are located within the depression or rib 15 and that no part of the same projects forwardly beyond the front face of the bar. This arrangement permits the bolts 18 to be inserted from the rear and consequently the nuts or fastening means 19 are located in an accessible and more or less protected position.

Suitable attaching means or brackets 20 are provided for detachably attaching the rear ends of the springs to the vehicle. As shown, the brackets 20 each comprises a front substantially vertical face 21 against which the rear or largest convolution of the conical or telescopic spring 16 engages. The face 21 of the bracket 20 is provided with forwardly extending ears or attaching members 22 which engage the outer flat surface of the rearmost convolution of the spring and are secured thereto as by means of rivets. The rearmost portion of the bracket conforms to the forward end of the corresponding chassis frame member 11 to which it is secured by any suitable means as the U-bolts 23.

A resilient member such as the rubber block 24 secured in a suitable recess 25 in the face of each bracket 20 may be employed in connection with each spring for limiting the rearward movement of the bumper bar.

The form of the device shown in Fig. 3 differs from that shown in Figs. 1 and 2 in that the buffer bar 13ª is composed of a plurality of flat plates horizontally arranged and vertically spaced.

The form of the device shown in Figs. 4 and 5 differs from that shown in Fig. 3 in that the spring is formed from a wire or rod circular in cross section instead of from a band rectangular in cross section as shown in Figs. 1 and 2.

The bumper bar is of the same construction in Figs. 3, 4 and 5, and comprises a series of thin, flat plates 26, which may be curved rearwardly at ends as is usual in such constructions. The bars are arranged in vertical alignment and the outer ends of the same are secured in spaced relation by means of spacers 27 and suitable rivets or bolts. The bumper bar is secured to the outer end of the springs in any suitable manner, as by means of the clips 28, 29. The clips are formed with recesses or corrugations which are adapted to engage the edges of the plates 26 and secure the same in spaced relation.

Suitable fastening means, such as the bolt or rivet 19ª is adapted to secure the clips 28 and 29 to the bar and the bar to the springs. The springs 16ª are also telescopically or conically arranged to afford a maximum resilience and movement without the necessity of positioning the bar at an objectionable distance in front of the vehicle. The function of these springs is substantially the same as the springs 16 shown in Figs. 1, 2 and 3. The rear ends of the springs 16ª are secured to the brackets 20ª in any suitable manner as by means of the flanges 22ª which may be upset or peened over the coil to retain the same in proper position.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In a device of the class described, a bumper bar comprising a plurality of plates, a flat metal conical spring, means for connecting one end of said spring to said bar and means secured to the other end of said spring for attaching said spring to the frame of a motor vehicle.

2. In a device of the class described, a chassis frame comprising a pair of side bars, a rigid bumper bar extending from side to side of said frame, a plurality of conical springs rectangular in cross-section rigidly secured to said bar and means for rigidly connecting said springs to said frame.

3. In a device of the class described, a bumper bar, said bar comprising a plurality of plates arranged horizontally and clips for securing said plates in vertically spaced relation, and means secured to said clips for supporting said bar.

4. In combination, a bumper bar, a pair of telescopic resilient members of flat material, means for securing said members to said bar and means for securing said members to a motor vehicle frame.

5. In combination, a bumper bar, a pair of telescopic springs for supporting the same, brackets for securing said springs to a motor vehicle and resilient members for limiting the compression of said springs.

6. In combination, a rigid bumper bar, coiled springs for supporting said bar, and brackets for securing said springs to a vehicle, said brackets being provided with vertical faces against which said springs abut and extensions on the peripheral edges of said faces for engaging the rearmost coils of said springs.

WALTER H. COTTON.